(12) United States Patent
Xie

(10) Patent No.: US 10,305,842 B2
(45) Date of Patent: May 28, 2019

(54) METHOD AND DEVICE FOR SENDING MESSAGES

(71) Applicant: BEIJING XIAOMI MOBILE SOFTWARE CO., LTD., Beijing (CN)

(72) Inventor: Yan Xie, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/131,032

(22) Filed: Sep. 14, 2018

(65) Prior Publication Data

US 2019/0089666 A1 Mar. 21, 2019

(30) Foreign Application Priority Data

Sep. 18, 2017 (CN) .......................... 2017 1 0839670

(51) Int. Cl.
*H04L 12/58* (2006.01)
*H04W 4/02* (2018.01)
*H04W 4/021* (2018.01)
*H04W 4/029* (2018.01)

(52) U.S. Cl.
CPC .............. *H04L 51/24* (2013.01); *H04L 51/20* (2013.01); *H04W 4/021* (2013.01); *H04W 4/029* (2018.02)

(58) Field of Classification Search
CPC ........ H04L 51/24; H04L 51/20; H04W 4/029; H04W 4/021
USPC ............ 455/404.1–404.2, 412.1–414.3, 445, 455/456.1–458
See application file for complete search history.

(56) References Cited

U.S. PATENT DOCUMENTS

| 9,042,912 B1 * | 5/2015 | Bunner ................... H04L 67/18 455/456.1 |
| 2015/0026265 A1 * | 1/2015 | Huang .................. H04L 51/043 709/206 |
| 2017/0201858 A1 * | 7/2017 | Li ............................ H04W 4/21 |
| 2018/0047038 A1 * | 2/2018 | DeLuca ................. G06Q 50/01 |
| 2018/0158454 A1 * | 6/2018 | Campbell ............... G10L 15/22 |

* cited by examiner

*Primary Examiner* — Michael Y Mapa
(74) *Attorney, Agent, or Firm* — Syncoda LLC; Feng Ma

(57) ABSTRACT

A method of sending messages includes: obtaining a target message to be sent to a target account; determining a target terminal nearest to a reference terminal corresponding to the target account from terminals where the target account logged in; sending the target message to the terminals where the target account logged in, and sending an instruction message to the target terminal, in which the instruction message is configured to instruct the target terminal to send out a prompt signal for the target message.

20 Claims, 3 Drawing Sheets

METHOD AND DEVICE FOR SENDING MESSAGES

CROSS-REFERENCE TO RELATED APPLICATIONS

This application claims priority to Chinese Patent Application CN 201710839670.6, filed on Sep. 18, 2017, the entire contents of which are incorporated herein by reference.

BACKGROUND

With rapid development of the mobile communication technologies, functions of various terminals and servers become more and more powerful. When a user logs on a same account from different terminals, a server may send same information (for example, communication information, advertisement information, notification information, and the like) to the different terminals where the account is logged on, such that the user can view the information on different terminals. At the same time, the server may send an instruction message to a terminal last operated by the user, such that the terminal may perform a prompt (such as a ring, a vibration, a flicker, or the like) after receiving the instruction message.

SUMMARY

The present disclosure generally relates to a computer technology field, and more particularly to a method and a device for sending messages.

In an aspect, a method of sending messages to terminals for one or more users is provided, the method including: obtaining a target message to be sent to a target account; determining a target terminal nearest to a reference terminal corresponding to the target account from terminals where the target account logged in; and sending the target message to the terminals where the target account logged in, and sending an instruction message to the target terminal, wherein the instruction message is configured to instruct the target terminal to send out a prompt signal for the target message.

In some embodiments, the determining the target terminal nearest to a reference terminal corresponding to the target account from terminals where the target account logged in includes: obtaining location information of each terminal where the target account logged in and location information of the reference terminal corresponding to the target account; and determining the target terminal nearest to the reference terminal according to the location information of each terminal where the target account logged in and the location information of the reference terminal.

In some embodiments, the location information comprises at least one of a location coordinates, a building involved, or floor information in the building involved; the determining the target terminal nearest to the reference terminal according to the location information of each terminal where the target account logged in and the location information of the reference terminal includes: determining a target terminal having a shortest movement distance from the reference terminal in the terminals where the target account logged in according to the location information of each terminal where the target account logged in and the location information of the reference terminal.

In some embodiments, the determining the target terminal nearest to a reference terminal corresponding to the target account from terminals where the target account logged in includes: obtaining signal strength information between each terminal where the target account logged in and the reference terminal corresponding to the target account; and determining the target terminal nearest to the reference terminal based on the signal strength information corresponding to each terminal where the target account logged in.

In some embodiments, the sending the target message to the terminals where the target account logged in includes: sending the target message to one or more of the terminals where the target account logged in, wherein each of the one or more terminals has a distance less than a preset threshold from the reference terminal.

In some embodiments, the determining the target terminal nearest to a reference terminal corresponding to the target account from terminals where the target account logged in includes: if a wearing message sent from the reference terminal corresponding to the target account is received in a preset period prior to obtaining the target message, determining the target terminal nearest to the reference terminal corresponding to the target account from the terminals where the target account logged in; wherein the wearing message is periodically sent by the reference terminal in a situation that the reference terminal detects that the reference terminal is worn by a user.

In some embodiments, the method further includes: in a situation that the wearing message sent from the reference terminal corresponding to the target account is not received in the preset period prior to obtaining the target message, determining the target terminal as the terminal which the user operates for the last time from the terminals where the target account logged in.

In another aspect, a device configured to send messages is provided, the device including: a processor; and a memory device configured to store instructions executable by the processor, wherein the processor is configured to: obtain a target message to be sent to a target account; determine a target terminal nearest to a reference terminal corresponding to the target account from terminals where the target account logged in; and send the target message to the terminals where the target account logged in, and send an instruction message to the target terminal, wherein the instruction message is configured to instruct the target terminal to send out a prompt signal for the target message.

In some embodiments, the processor is further configured to: obtain location information of each terminal where the target account logged in and location information of the reference terminal corresponding to the target account; and determine the target terminal nearest to the reference terminal according to the location information of each terminal where the target account logged in and the location information of the reference terminal.

In some embodiments, the location information comprises at least one of a location coordinates, a building involved, or floor information in the building involved; the processor is configured to: determine a target terminal having a shortest movement distance from the reference terminal in the terminals where the target account logged in according to the location information of each terminal where the target account logged in and the location information of the reference terminal.

In some embodiments, the processor is further configured to: obtain signal strength information between each terminal where the target account logged in and the reference terminal corresponding to the target account; and determine the target terminal nearest to the reference terminal based on the signal strength information corresponding to each terminal where the target account logged in.

In some embodiments, the processor is further configured to: send the target message to one or more of the terminals where the target account logged in, wherein each of the one or more of the terminals has a distance less than a preset threshold from the reference terminal.

In some embodiments, the processor is configured to: if a wearing message sent from the reference terminal corresponding to the target account is received in a preset period before obtaining the target message, determine the target terminal nearest to the reference terminal corresponding to the target account from the terminals where the target account logged in; wherein the wearing message is periodically sent by the reference terminal in a situation that the reference terminal detects that the reference terminal is worn by a user.

In some embodiments, the processor is further configured to: in a situation that the wearing message sent from the reference terminal corresponding to the target account is not received in the preset period prior to obtaining the target message, determine the target terminal as the terminal which the user operates for the last time from the terminals where the target account logged in.

In another aspect, a server is provided, including a processor and a memory device, wherein: the memory device has at least one instruction, at least one program, a code set or an instruction set stored thereon; and the least one instruction, the at least one program, the code set or the instruction set is configured to be loaded and performed by the processor to implement a method of sending messages, the method comprising: obtaining a target message to be sent to a target account; determining a target terminal nearest to a reference terminal corresponding to the target account from terminals where the target account logged in; and sending the target message to the terminals where the target account logged in, and sending an instruction message to the target terminal, wherein the instruction message is configured to instruct the target terminal to send out a prompt signal for the target message.

In some embodiments, the determining the target terminal nearest to a reference terminal corresponding to the target account from terminals where the target account logged in includes: obtaining location information of each terminal where the target account logged in and location information of the reference terminal corresponding to the target account; and determining the target terminal nearest to the reference terminal according to the location information of each terminal where the target account logged in and the location information of the reference terminal.

In some embodiments, the location information includes at least one of a location coordinates, a building involved, or floor information in the building involved; determining the target terminal nearest to the reference terminal according to the location information of each terminal where the target account logged in and the location information of the reference terminal includes: determining a target terminal having a shortest movement distance from the reference terminal in the terminals where the target account logged in according to the location information of each terminal where the target account logged in and the location information of the reference terminal.

In some embodiments, the determining a target terminal nearest to a reference terminal corresponding to the target account from terminals where the target account logged in includes: obtaining signal strength information between each terminal where the target account logged in and the reference terminal corresponding to the target account; and determining the target terminal nearest to the reference terminal based on the signal strength information corresponding to each terminal where the target account logged in.

In some embodiments, the sending the target message to the terminals where the target account logged in includes: sending the target message to a part of terminals where the target account logged in, wherein each of the part of terminals has a distance less than a preset threshold from the reference terminal.

In some embodiments, the determining the target terminal nearest to a reference terminal corresponding to the target account from terminals where the target account logged in includes: in a case that a wearing message sent from the reference terminal corresponding to the target account is received in a preset period prior to obtaining the target message, determining the target terminal nearest to the reference terminal corresponding to the target account from the terminals where the target account logged in; wherein the wearing message is periodically sent by the reference terminal in a situation that the reference terminal detects that the reference terminal is worn by a user.

It is to be understood that both the foregoing general description and the following detailed description are exemplary and explanatory only and are not restrictive of the present disclosure.

BRIEF DESCRIPTION OF THE DRAWINGS

The accompanying drawings referred to in the specification are a part of this specification, and provide illustrative embodiments consistent with the disclosure and, together with the detailed description, serve to illustrate some embodiments of the disclosure.

Figure 1:
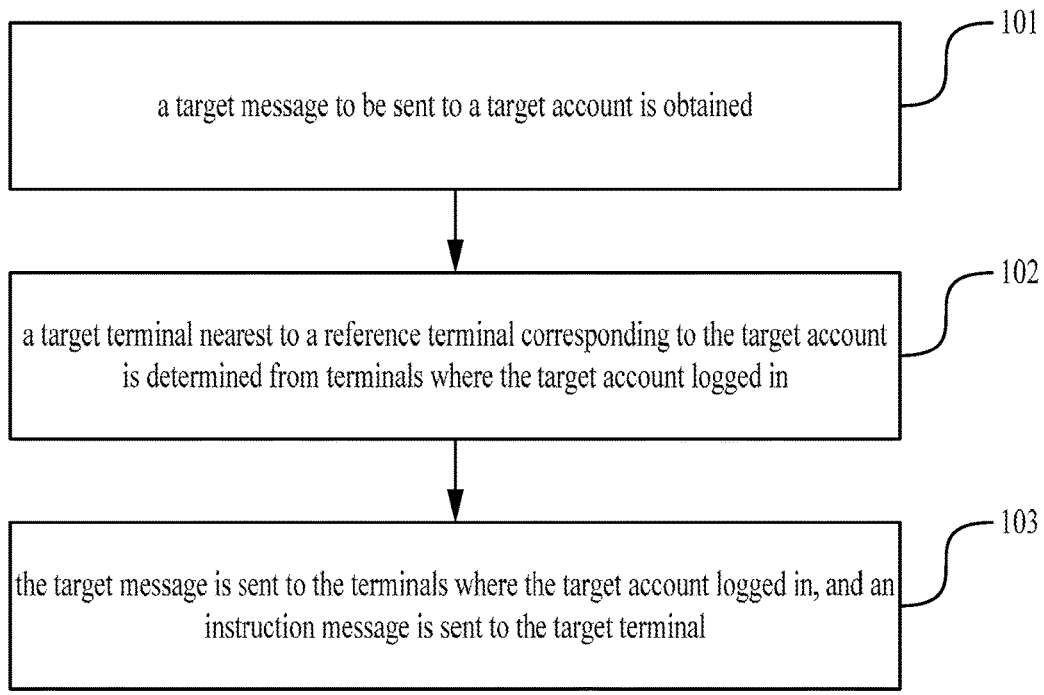
FIG. 1 is a flowchart illustrating a method for sending messages according to some embodiments.

Some embodiments of the present disclosure are illustrated in the drawings. Hereinafter, the description with more details will be given. The drawings and textual description are not to limit the scope of ideas of the present disclosure by any ways. Rather, with reference to the example embodiments, the concept of the present disclosure is explained to those of ordinary skill in the art.

DETAILED DESCRIPTION

Various embodiments of the present disclosure are described below with specific examples, and other advantages and effects of the present disclosure can be easily understood by those skilled in the field of technology from the contents disclosed in this specification. The following description refers to the accompanying drawings in which same numeral references in different drawings may represent the same or similar elements unless otherwise indicated. Apparently, the described embodiments are only a part of embodiments in the present disclosure, rather than all of them. The present disclosure can also be implemented or applied through different specific embodiments, and various details of the specification can also be modified or changed based on different viewpoints and applications without departing from the spirit of the present disclosure.

Various embodiments of the present disclosure provide a method for sending messages. The method can be implemented with a server. The server may be a server having a function of sending information. For example, the server may be a back-end server of communication software.

The server may include components such a processor, memory, a transceiver, and the like. The processor may be a CPU (Central Processing Unit), which may be configured to perform processing such as determining location information of a target terminal and the like. The memory may be a RAM (Random-Access Memory), a Flash drive, or the like, configured to store received data, data required during processing, date generated during processing, and the like.

For example, the memory may be configured to store location information of a reference terminal, location information of a target terminal, a wearing message of the reference terminal, and the like. The transceiver may be configured to perform data transmission with a terminal. For example, the transceiver may send a target message to the terminal, may send a prompt signal of the target message to the terminal. The transceiver may include an antenna, a match circuit, a modem, and the like.

Some embodiments of the present disclosure provide a method for sending messages. As illustrated in FIG. 1, the method may include followings.

In step 101, a target message to be sent to a target account is obtained.

According to some embodiments of the present disclosure, in many cases, a server of an application may send information to a certain registered account (i.e., the target account) of the application. For example, when the server receives communication information sent to the target account from other accounts, the target message to be sent to the target account is the communication information.

In another example, when the server pushes news, advertisements and the like to the target account, the target message to be sent to the target account is the abovementioned news, advertisements and the like.

In yet another example, when a certain terminal having the target account logged in receives a phone call, a message, or an email, the server may be informed, and the server may send notification information to the target account. In this case, the target message to be sent to the target account is the abovementioned notification information.

In step 102, a target terminal nearest to a reference terminal corresponding to the target account is determined from terminals where the target account is logged on.

The reference terminal can be a terminal that is set by the user and is bound with the target account for determining a location of the user. For example, the reference terminal can be a wearable device, such as a smart bracelet, smart watch, smart shoes, and the like.

Figure 2:
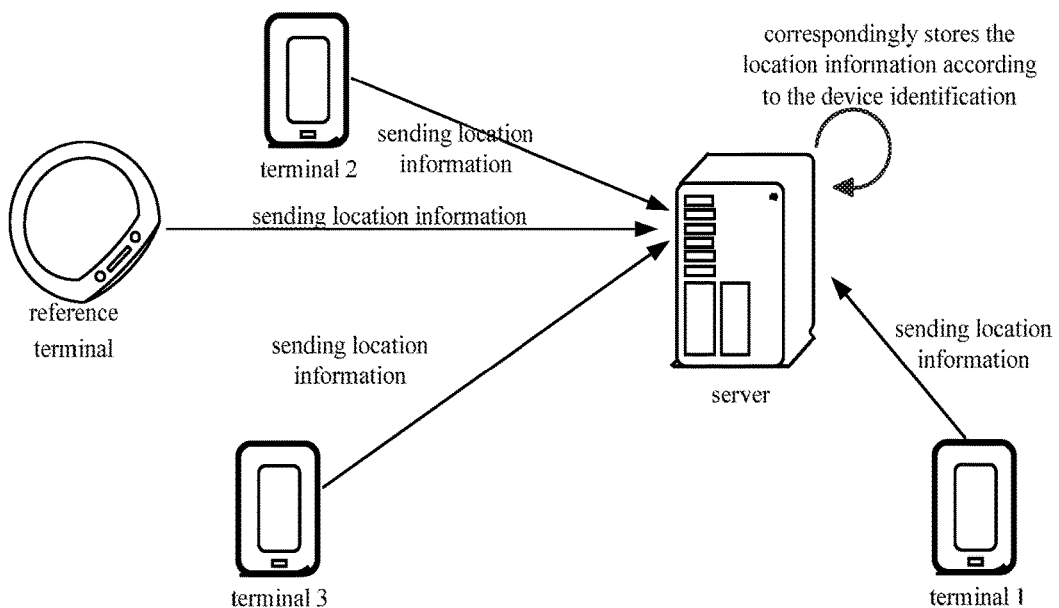
FIG. 2 is a schematic diagram illustrating a method for sending messages according to some embodiments.

In some embodiments of the present disclosure, as illustrated in FIG. 2, a process of bounding an account and the reference terminal is first described. The reference terminal may be pre-installed with a wearable device end program of the abovementioned applications.

When the user wants to bound the reference terminal with the target account, the abovementioned application may be started in a certain terminal, and may be connected to the reference terminal. For example, the abovementioned application may be connected to the reference terminal through Bluetooth, wireless network, and the like.

The target account can then be logged on from the reference terminal via cooperation of the abovementioned application and the wearable device end program. A device identification of the reference terminal can be obtained and sent to the server. The server records the device identification and an account identification of the target account correspondingly in a binding relationship table of the account and the reference terminal.

After the reference terminal is bounded with the target account, the user can set a way of the reference terminal sending location information to the server via the wearable device end program. The way of the reference terminal sending location information to the server may be sending periodically or sending based on triggering.

For example, the reference terminal may send the location information to the server every 10 minutes, or the reference terminal may send the location information to the server when the location information of the reference terminal changes. The server receives the location information of the reference terminal, and correspondingly stores the location information according to the device identification of the reference terminal.

When the user logs in the target account on a terminal, the terminal may periodically send terminal status information of the terminal to the server. The terminal status information may include the location information of the terminal, signal strength of a signal received by the terminal and sent from the reference terminal corresponding to an account locally logged in, history operation information, and the like.

For example, the history information may include a time point when the terminal last performs a user operation after the terminal logs in the target account. The user operation may be any user operation at the terminal.

After the server obtains the target message to be sent to the target account, the server obtains the terminal status information of the terminal having the target account logged in. Thereafter, the server determines the target terminal nearest to the reference terminal corresponding to the target account according to the terminal status information.

In some embodiments, the server may select the target terminal nearest to the reference terminal from the terminals where the target account logged in according to the location information of the terminals.

A corresponding processing process may be as follows. Location information of each terminal where the target account logged in and location information of the reference terminal corresponding to the target account are obtained. The target terminal nearest to the reference terminal is determined according to the location information of each terminal where the target account logged in and the location information of the reference terminal.

In some embodiments of the present disclosure, after the server obtains the target message to be sent to the target account, the server obtains the terminal status information of the terminal having the target account logged in, and obtains location information from the terminal status information.

The server obtains the binding relationship table of the account and the reference terminal, and obtains a device identification corresponding to the account identification of the target account. Next, location information of a terminal corresponding to the device identification is found according to the device identification. The server obtains the location information of each terminal where the target account logged in and the location information of the reference terminal.

Thereafter, the server calculates a distance between each terminal where the target account logged in and the reference terminal according to the abovementioned location information. A terminal (i.e., the target terminal) nearest to the reference terminal is determined.

In some embodiments, the abovementioned distance can be a straight-line distance, or a movement distance.

In some embodiments, the server may select a target terminal having a shortest movement distance from the reference terminal. Different from the straight-line distance, the movement distance is a length of a movement route between a certain terminal and the reference terminal. Correspondingly, the location information may include a location coordinate, a building involved, and floor information in the building involved.

The processing of step 102 can include the following steps. A target terminal having a shortest movement distance from the reference terminal is determined in the terminals where the target account logged in according to the location information of each terminal where the target account logged in and the location information of the reference terminal.

In some embodiments of the present disclosure, the server obtains the location information of the reference terminal and the location information of each terminal where the target account logged in, and obtains the location coordinate, the building involved, and the floor information in the building involved from the location information.

Next, route lengths (e.g., the movement distance) of feasible routes from the reference terminal to each terminal where the target account logged in according to the abovementioned information. Thereafter, a terminal (e.g., the target terminal having a shortest movement distance from the reference terminal) corresponding to a feasible route having a shortest route length is determined.

For example, terminal A is on the third floor, the user wears the reference terminal (i.e., the location information of the reference terminal is the location information of the user) in a room on the fourth floor just above terminal A. A height between the two floors is about 2 meters. Terminal B is 8 meters away from the user on the fourth floor and 5 meters away from an elevator. The server can therefore obtain that a shortest movement distance between terminal A and the user is 12 meters, and that a shortest movement distance between terminal B and the user is 8 meters. As such, terminal B is the target terminal.

In some embodiments, the target terminal nearest to the reference terminal can be determined according to a signal strength between terminals, and a corresponding processing process may be as follows. Signal strength information between each terminal where the target account logged in and the reference terminal corresponding to the target account is obtained respectively. The target terminal nearest to the reference terminal is determined based on the signal strength information corresponding to each terminal where the target account logged in.

In some embodiments of the present disclosure, after a terminal logs in an account, the server may send a device identification of the reference terminal corresponding to the account to the terminal. The terminal may store the device identification. The reference terminal broadcasts a detection signal according to a preset period. The detection signal carries the device identification of the reference terminal.

After another terminal receives the detection signal, the terminal may extract the device identification in the detection signal. If the extracted device identification is same as locally stored device identification, it can be determined that the detection signal is sent from a reference terminal corresponding to a locally logged in account of the terminal.

Thereafter, signal strength information of the detection signal may be determined, and the signal strength information is reported to the server as the terminal status information together with the locally logged in account. The server may compare signal strength information sent from each terminal where the locally logged in account logged in, and determines a terminal corresponding to strongest signal strength information as the target terminal nearest to the reference terminal.

In some embodiments, the processing is performed when it is determined that the reference terminal is worn by a user. Correspondingly, the process of step 102 can include the following.

If a wearing message sent from the reference terminal is received in a preset period before obtaining the target message, the target terminal nearest to the reference terminal is determined from the terminals where the target account logged in according to the location information of each terminal where the target account logged in and the location information of the reference terminal.

The wearing message is periodically sent to a server by the reference terminal in a preset manner when the reference terminal detects that the reference terminal is worn by a user.

In some embodiments of the present disclosure, the server may predetermine a preset time period. If the server receives the wearing message sent from the reference terminal in a preset period before obtaining the target message, the server determines the target terminal nearest to the reference terminal from the terminals where the target account logged in according to the location information of each terminal where the target account logged in and the location information of the reference terminal.

The preset period may be a preset length of time for the server to determine whether the user wears the reference terminal. For example, the terminal where the target account logged in periodically sends terminal information to the server, the reference terminal periodically sends a wearing message to the server, the preset period may be any length of time period not less than both a time period during which the server receives the terminal information and a time period during which the server receives the wear information. In some embodiments, the preset period may be a time period not less than a time period for the server to receive the terminal information and the wear information.

In some embodiments, when it is determined that the reference terminal is not worn by a user, the process of determining the target terminal of step 102 may be as follows. If the wearing message sent from the reference terminal is not received in the preset period before obtaining the target message, the target terminal is determined as the terminal which the user operates for the last time from the terminals where the target account logged in.

In some embodiments of the present disclosure, if the server does not receive the wearing message sent from the reference terminal in the preset period prior to obtaining the target message, the server obtains the terminal status information of the terminal where the target account logged in. Next, a time point when the terminal last performs a user operation after the terminal logs in the target account from the abovementioned terminal status information. The user operation may be any user operation in the terminal. The terminal (i.e., the target terminal) that the user operates for the last time is determined according to the abovementioned time point.

In step 103, the target message is sent to the terminals where the target account logged in, and an instruction message is sent to the target terminal.

The instruction message is configured to instruct the target terminal to send out a prompt signal for the target message.

In some embodiments of the present disclosure, a correspondence relationship between types of the target message and different prompt signals may be pre-stored in each terminal. The server sends the target message to the terminals where the target account logged in, and sends the instruction message to the target terminal. After the target terminal receives the target message and the instruction message sent from the server, the target terminal obtains a type of the target message, and then the target terminal search for a prompt signal corresponding to the type of the target message, and sends out the prompt signal. For example, the prompt signal may be a ring, a vibration, a flicker, or the like.

In some embodiments, the server may send the target message only to a terminal that is closer to the reference terminal, and a corresponding process may be as follows. The target message is sent to one or more of the terminals where the target account logged in. Each of the one or more of the terminals has a distance less than a preset threshold from the reference terminal.

The distance may be a straight-line distance, a movement distance, etc.

Figure 3:
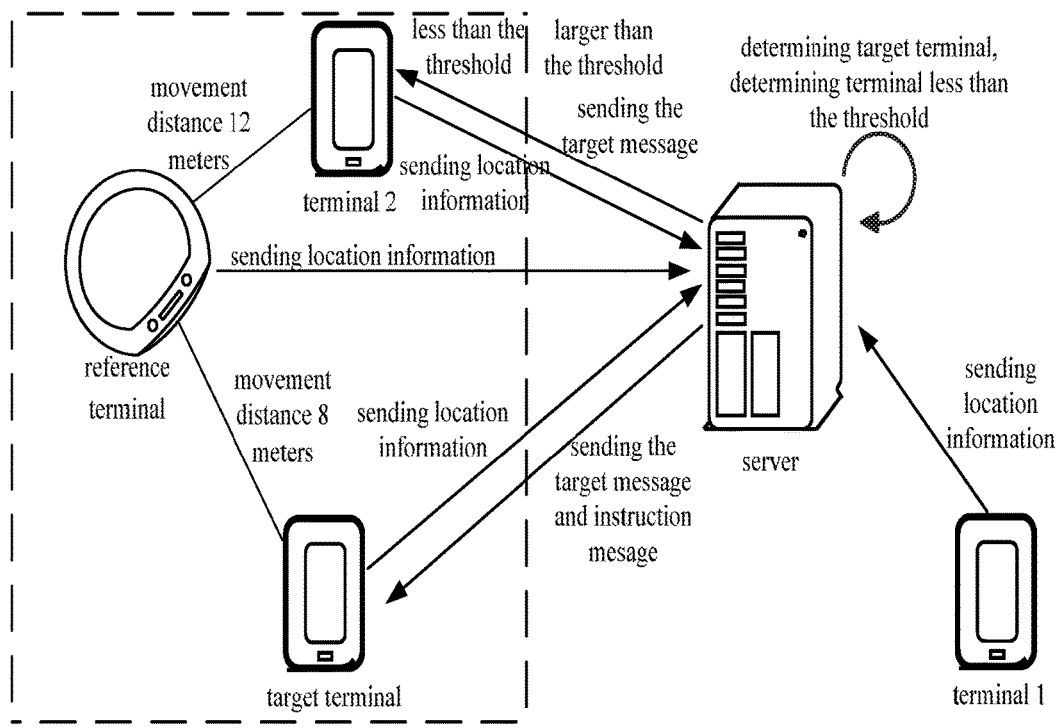
FIG. 3 is a schematic diagram illustrating a method for sending messages according to some embodiments.

As illustrated in FIG. 3, in some embodiments of the present disclosure, a threshold may be pre-stored in the server, configured to determine whether a distance between other terminals and the reference terminal is sufficiently short. The server may determine a terminal whose distance from the reference terminal is less than the threshold from the terminals where the target account logged in. The server obtains the location information of the terminals where the target account logged in, and the server determines the terminal whose distance from the reference terminal is less than the threshold according to the abovementioned location information. The server then sends the target message to each determined terminal.

In some embodiments of the present disclosure, the target message to be sent to the target account is obtained, the target terminal nearest to the reference terminal corresponding to the target account is determined from the terminals where the target account logged in, the target message is sent to the terminals where the target account logged in, and the instruction message is sent to the target terminal, in which the instruction message is configured to instruct the target terminal to send out a prompt signal for the target message.

The reference terminal may be a frequently worn terminal set by the user, and thus the terminal nearest to the reference terminal may be considered as the terminal nearest to the user, based on the above process, the terminal nearest to the user may send out the prompt signal for the target message to prompt the user to view the target message in time, thereby improving immediacy of the user to obtain information.

Figure 4:
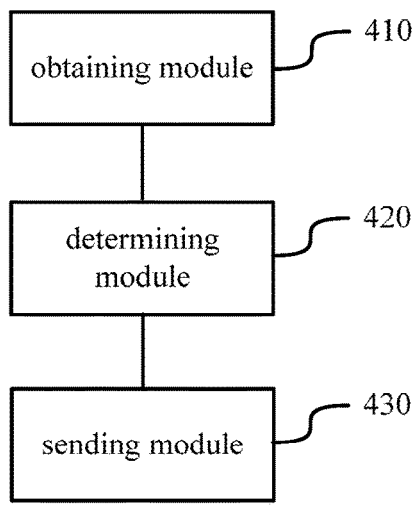
FIG. 4 is a schematic diagram illustrating a device for sending messages according to some embodiments.

Some embodiments of the present disclosure provide a device configured to send messages. As illustrated in FIG. 4, the device may include an obtaining portion or module 410, a determining portion 420, and a sending portion 430.

The obtaining portion 410 is configured to obtain target message to be sent to a target account.

The determining portion 420 is configured to determine a target terminal nearest to a reference terminal corresponding to the target account from terminals where the target account logged in.

The sending portion 430 is configured to send the target message to the terminals where the target account logged in, and to send an instruction message to the target terminal. The instruction message is configured to instruct the target terminal to send out a prompt signal for the target message.

In some embodiments, the determining portion 420 is configured to: obtain location information of each terminal where the target account logged in and location information of the reference terminal corresponding to the target account; and determine the target terminal nearest to the reference terminal according to the location information of each terminal where the target account logged in and the location information of the reference terminal.

In some embodiments, the location information includes a location coordinate, a building involved, and floor information in the building involved.

The determining portion 420 can be configured to: determine a target terminal having a shortest movement distance from the reference terminal in the terminals where the target account logged in according to the location information of each terminal where the target account logged in and the location information of the reference terminal.

In some embodiments, the determining portion 420 is configured to: obtain signal strength information between each terminal where the target account logged in and the reference terminal corresponding to the target account; and determine the target terminal nearest to the reference terminal based on the signal strength information corresponding to each terminal where the target account logged in.

In some embodiments, the sending portion 430 is configured to: send the target message to one or more of the terminals where the target account logged in. Each of the one or more of the terminals has a distance less than a preset threshold from the reference terminal.

In some embodiments, the determining portion 420 is configured to: if a wearing message sent from the reference terminal corresponding to the target account is received in a preset period prior to obtaining the target message, determine the target terminal nearest to the reference terminal corresponding to the target account from the terminals where the target account logged in. The wearing message is periodically sent by the reference terminal in a situation that the reference terminal detects that the reference terminal is worn by a user.

In some embodiments, the determining portion 420 is further configured to: if the wearing message sent from the reference terminal corresponding to the target account is not received in the preset period prior to obtaining the target message, determine the target terminal as the terminal which the user operates for the last time from the terminals where the target account logged in.

In some embodiments of the present disclosure, the target message to be sent to the target account is obtained, the target terminal nearest to the reference terminal corresponding to the target account is determined from the terminals where the target account logged in, the target message is sent to the terminals where the target account logged in, and the instruction message is sent to the target terminal, in which the instruction message is configured to instruct the target terminal to send out a prompt signal for the target message.

The reference terminal may be a frequently worn terminal set by the user, and thus the terminal nearest to the reference terminal may be considered as the terminal nearest to the user, based on the abovementioned process, the terminal nearest to the user may send out the prompt signal for the target message to prompt the user to view the target message in time, thereby improving immediacy of the user to obtain information.

It should be noted that, the device configured to send messages provided in above embodiments is described in an example of dividing the functional blocks or modules when sending information. In some implementations, the above functions can be assigned by different functional blocks, portions, or modules as needed. For example, internal structures of the device can be divided into different functional portions, blocks, or modules to realize all or part of the functions described above.

In addition, the device configured to send messages provided in above embodiments can correspond to or be implemented with various embodiments of the methods for sending messages, and specific implementations of which can refer to various embodiments of the methods and will not be elaborated herein.

Figure 5:
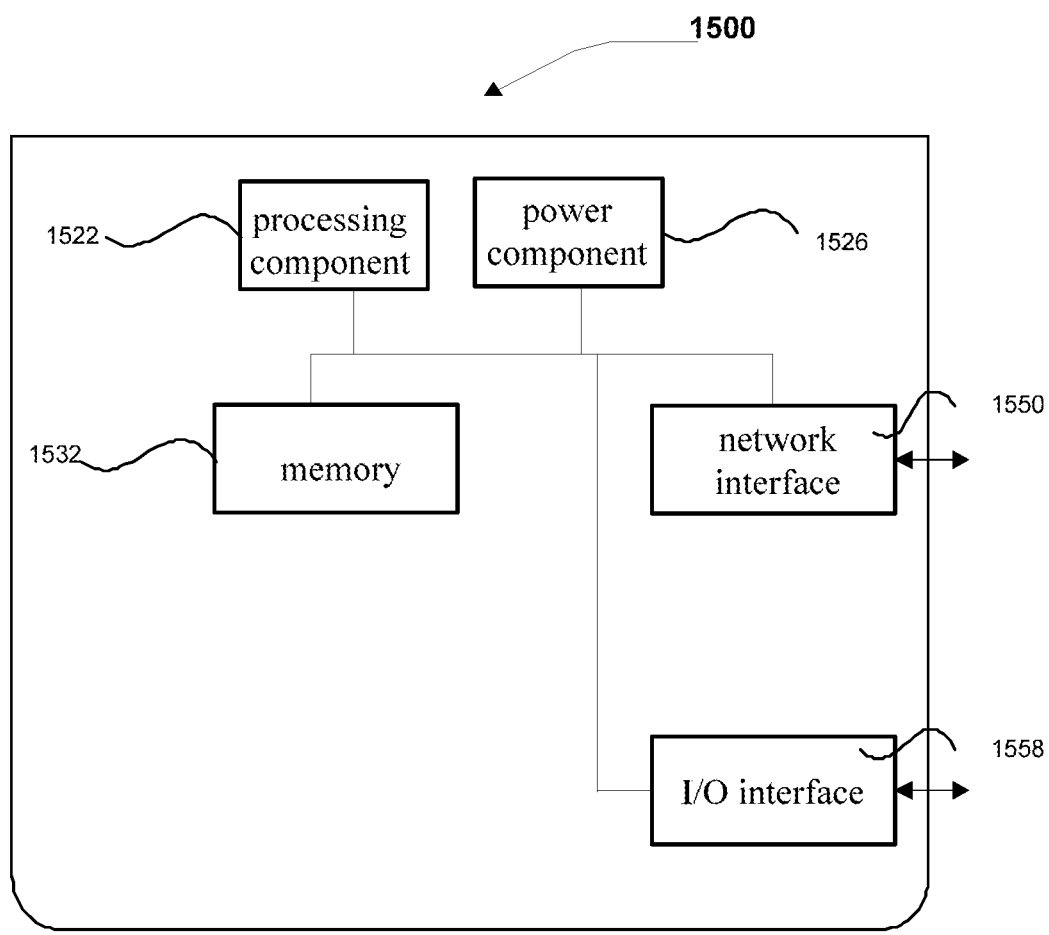
FIG. 5 is a schematic diagram illustrating a server according to some embodiments.

FIG. 5 is a schematic diagram illustrating a device 1500 configured to send messages according to some embodiments. In an example, the device 1500 may be provided as a server. As illustrated in FIG. 5, the device 1500 may include a processing component 1522, and may further include one or more processor, and memory resources represented by memory 1532.

The memory 1532 is configured to store instructions executable by the processing circuit 1522. For example, the instructions may be an application. The application stored in the memory 1532 may include one or more modules. Each of the one or more modules corresponds to one group of instructions. In addition, the processing circuit 1522 is configured to execute the instructions to implement the abovementioned method of sending messages.

The device 1500 may further include a power component 1526 configured to perform power management of the device 1500, a wired or wireless network interface 1550 configured to connect the device 1500 to a network, and an input/output (I/O) interface 1558. The device 1500 may operate an operating system stored in the memory 1532. For example, the operating system may be Windows Server™, Mac OS X™, Unix™, Linux™, FreeBSD™, or the like.

The device 1500 may include a memory device and one or more programs. The one or more programs may be stored in the memory, and is configured to be executed by one or more processors. The one or more programs may include instructions configured to perform the following operations.

A target message to be sent to a target account is obtained.

Location information of each terminal where the target account logged in and location information of the reference terminal corresponding to the target account are obtained.

The target terminal nearest to the reference terminal is determined according to the location information of each terminal where the target account logged in and the location information of the reference terminal.

The target message is sent to the terminals where the target account logged in, and an instruction message is sent to the target terminal. The instruction message is configured to instruct the target terminal to send out a prompt signal for the target message.

In some embodiments, sending the target message to the terminals where the target account logged in includes: sending the target message to one or more of the terminals where the target account logged in. Each of the one or more of the terminals has a distance less than a preset threshold from the reference terminal.

In some embodiments, determining a target terminal nearest to a reference terminal corresponding to the target account from terminals where the target account logged in includes: if a wearing message sent from the reference terminal corresponding to the target account is received in a preset period before obtaining the target message, determining the target terminal nearest to the reference terminal corresponding to the target account from the terminals where the target account logged in. The wearing message is periodically sent by the reference terminal in a situation that the reference terminal detects that the reference terminal is worn by a user.

In some embodiments, the instructions further include: if the wearing message sent from the reference terminal corresponding to the target account is not received in the preset period before obtaining the target message, determining the target terminal as the terminal which the user operates for the last time from the terminals where the target account logged in.

In some embodiments, the location information includes a location coordinate, a building involved, and floor information in the building involved. Determining the target terminal nearest to the reference terminal according to the location information of each terminal where the target account logged in and the location information of the reference terminal includes: determining a target terminal having a shortest movement distance from the reference terminal in the terminals where the target account logged in according to the location information of each terminal where the target account logged in and the location information of the reference terminal.

In some embodiments of the present disclosure, the target message to be sent to the target account is obtained, the target terminal nearest to the reference terminal corresponding to the target account is determined from the terminals where the target account logged in, the target message is sent to the terminals where the target account logged in, and the instruction message is sent to the target terminal, in which the instruction message is configured to instruct the target terminal to send out a prompt signal for the target message, the reference terminal may be a frequently worn terminal set by the user, thus the terminal nearest to the reference terminal may be considered as the terminal nearest to the user. Based on the above process, the terminal nearest to the user may send out the prompt signal for the target message to prompt the user to view the target message in time, thus improving immediacy of the user to obtain information.

In another aspect, a computer-readable storage medium is provided.

The computer-readable storage medium has at least one instruction, at least one program, a code set or an instruction set stored thereon. The at least one instruction, the at least one program, the code set or the instruction set is loaded and performed by a processor to implement the methods of sending messages as described above.

In some implementations, the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), plasma, other flexible configuration, or any other monitor for displaying information to the user and a keyboard, a pointing device, e.g., a mouse, trackball, etc., or a touch screen, touch pad, etc., by which the user can provide input to the computer.

In some embodiments, other types of displays, such as a light-emitting diode (LED) display, an organic LED (OLED) display, a micro LED (μLED) display, a quantum-dot LED (QLED) display, etc. The displays can be touch screens as well.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counter-clockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method of sending messages to terminals for one or more users, comprising:
   obtaining a target message to be sent to a target account;
   determining a target terminal nearest to a reference terminal corresponding to the target account from terminals where the target account logged in; and
   sending the target message to the terminals where the target account logged in, and sending an instruction message to the target terminal,
   wherein the instruction message is configured to instruct the target terminal to send out a prompt signal for the target message.

2. The method according to claim 1, wherein the determining the target terminal nearest to a reference terminal corresponding to the target account from terminals where the target account logged in comprises:
   obtaining location information of each terminal where the target account logged in and location information of the reference terminal corresponding to the target account; and
   determining the target terminal nearest to the reference terminal according to the location information of each terminal where the target account logged in and the location information of the reference terminal.

3. The method according to claim 2, wherein:
the location information comprises at least one of a location coordinates, a building involved, or floor information in the building involved;
the determining the target terminal nearest to the reference terminal according to the location information of each terminal where the target account logged in and the location information of the reference terminal comprises:
determining a target terminal having a shortest movement distance from the reference terminal in the terminals where the target account logged in according to the location information of each terminal where the target account logged in and the location information of the reference terminal.

4. The method according to claim 1, wherein the determining the target terminal nearest to a reference terminal corresponding to the target account from terminals where the target account logged in comprises:
obtaining signal strength information between each terminal where the target account logged in and the reference terminal corresponding to the target account; and
determining the target terminal nearest to the reference terminal based on the signal strength information corresponding to each terminal where the target account logged in.

5. The method according to claim 1, wherein the sending the target message to the terminals where the target account logged in comprises:
sending the target message to one or more of the terminals where the target account logged in, wherein each of the one or more terminals has a distance less than a preset threshold from the reference terminal.

6. The method according to claim 1, wherein the determining the target terminal nearest to a reference terminal corresponding to the target account from terminals where the target account logged in comprises:
if a wearing message sent from the reference terminal corresponding to the target account is received in a preset period prior to obtaining the target message, determining the target terminal nearest to the reference terminal corresponding to the target account from the terminals where the target account logged in;
wherein the wearing message is periodically sent by the reference terminal in a situation that the reference terminal detects that the reference terminal is worn by a user.

7. The method according to claim 6, further comprising:
in a situation that the wearing message sent from the reference terminal corresponding to the target account is not received in the preset period prior to obtaining the target message, determining the target terminal as the terminal which the user operates for the last time from the terminals where the target account logged in.

8. A device configured to send messages, comprising:
a processor; and
a memory device configured to store instructions executable by the processor,
wherein the processor is configured to:
obtain a target message to be sent to a target account;
determine a target terminal nearest to a reference terminal corresponding to the target account from terminals where the target account logged in; and
send the target message to the terminals where the target account logged in, and send an instruction message to the target terminal, wherein the instruction message is configured to instruct the target terminal to send out a prompt signal for the target message.

9. The device according to claim 8, wherein the processor is further configured to:
obtain location information of each terminal where the target account logged in and location information of the reference terminal corresponding to the target account; and
determine the target terminal nearest to the reference terminal according to the location information of each terminal where the target account logged in and the location information of the reference terminal.

10. The device according to claim 9, wherein:
the location information comprises at least one of a location coordinates, a building involved, or floor information in the building involved;
the processor is configured to:
determine a target terminal having a shortest movement distance from the reference terminal in the terminals where the target account logged in according to the location information of each terminal where the target account logged in and the location information of the reference terminal.

11. The device according to claim 8, wherein the processor is further configured to:
obtain signal strength information between each terminal where the target account logged in and the reference terminal corresponding to the target account; and
determine the target terminal nearest to the reference terminal based on the signal strength information corresponding to each terminal where the target account logged in.

12. The device according to claim 8, wherein the processor is further configured to:
send the target message to one or more of the terminals where the target account logged in, wherein each of the one or more of the terminals has a distance less than a preset threshold from the reference terminal.

13. The device according to claim 8, wherein the processor is configured to:
if a wearing message sent from the reference terminal corresponding to the target account is received in a preset period before obtaining the target message, determine the target terminal nearest to the reference terminal corresponding to the target account from the terminals where the target account logged in;
wherein the wearing message is periodically sent by the reference terminal in a situation that the reference terminal detects that the reference terminal is worn by a user.

14. The device according to claim 13, wherein the processor is further configured to:
in a situation that the wearing message sent from the reference terminal corresponding to the target account is not received in the preset period prior to obtaining the target message, determine the target terminal as the terminal which the user operates for the last time from the terminals where the target account logged in.

15. A server, comprising a processor and a memory device, wherein:
the memory device has at least one instruction, at least one program, a code set or an instruction set stored thereon; and
the least one instruction, the at least one program, the code set or the instruction set is configured to be loaded and performed by the processor to implement a method of sending messages, the method comprising:

obtaining a target message to be sent to a target account;

determining a target terminal nearest to a reference terminal corresponding to the target account from terminals where the target account logged in; and sending the target message to the terminals where the target account logged in, and sending an instruction message to the target terminal, wherein the instruction message is configured to instruct the target terminal to send out a prompt signal for the target message.

16. The server according to claim 15, wherein the determining the target terminal nearest to a reference terminal corresponding to the target account from terminals where the target account logged in comprises:

obtaining location information of each terminal where the target account logged in and location information of the reference terminal corresponding to the target account; and determining the target terminal nearest to the reference terminal according to the location information of each terminal where the target account logged in and the location information of the reference terminal.

17. The server according to claim 16, wherein:

the location information comprises at least one of a location coordinates, a building involved, or floor information in the building involved;

determining the target terminal nearest to the reference terminal according to the location information of each terminal where the target account logged in and the location information of the reference terminal comprises:

determining a target terminal having a shortest movement distance from the reference terminal in the terminals where the target account logged in according to the location information of each terminal where the target account logged in and the location information of the reference terminal.

18. The server according to claim 15, wherein the determining the target terminal nearest to a reference terminal corresponding to the target account from terminals where the target account logged in comprises:

obtaining signal strength information between each terminal where the target account logged in and the reference terminal corresponding to the target account; and determining the target terminal nearest to the reference terminal based on the signal strength information corresponding to each terminal where the target account logged in.

19. The server according to claim 15, wherein the sending the target message to the terminals where the target account logged in comprises:

sending the target message to a part of terminals where the target account logged in, wherein each of the part of terminals has a distance less than a preset threshold from the reference terminal.

20. The server according to claim 15, wherein the determining the target terminal nearest to a reference terminal corresponding to the target account from terminals where the target account logged in comprises:

in a case that a wearing message sent from the reference terminal corresponding to the target account is received in a preset period prior to obtaining the target message, determining the target terminal nearest to the reference terminal corresponding to the target account from the terminals where the target account logged in;

wherein the wearing message is periodically sent by the reference terminal in a situation that the reference terminal detects that the reference terminal is worn by a user.

* * * * *